United States Patent Office 3,645,932
Patented Feb. 29, 1972

3,645,932
NUCLEATION OF HIGH MOLECULAR WEIGHT POLYAMIDES
Stuart A. Harrison and Kenneth B. Stokes, Minneapolis, Minn., assignors to General Mills, Inc.
No Drawing. Continuation-in-part of application Ser. No. 612,816, Jan. 31, 1967. This application May 22, 1969, Ser. No. 827,039
Int. Cl. C08g 41/04
U.S. Cl. 260—3                                    13 Claims

ABSTRACT OF THE DISCLOSURE

Relates to a process of developing rapidly the ultimate crystalline characteristics of certain polyamide resins derived from polymeric fat acids by the incorporation therein of a variety of nylon and other polyamide resins, polyethylene, polypropylene, polycarbonates and polyethylene acrylic acid copolymer ionomers.

---

This application is a continuation-in-part of our copending application, U.S. Ser. No. 612,816, filed Jan. 31, 1967, now abandoned.

Polyamide resins derived from polymeric fat acids have been known for a long period of time and they have been highly developed commercially. Some of these resins, particularly certain copolymer resins of this type, have a degree of crystallinity. The ultimate crystallinity of these resins, however, develops only very slowly and accordingly, when the ultimate properties are desired as, for example, in the case of an injection molded part, it is necessary to allow the parts to solidify and anneal slowly in the mold for a long period of time. This obviously cuts down on the productivity of any particular piece of equipment and, accordingly, it is desirable to be able to develop this ultimate crystallinity as rapidly as possible. This development of the ultimate crystallinity rapidly has been achieved in the present invention by the inclusion in the polyamide resin derived from polymeric fat acids of a variety of polymeric nucleating materials.

It is therefore an object of the present invention to provide a novel process of rapidly developing the ultimate crystallinity in certain polymeric fat acid polyamide resins by the inclusion therein of certain polymeric substances. It is also an object of the present invention to provide a polyamide resin of the above type.

As was pointed out, the polyamide resins to which the present invention is directed are the polyamide resins derived from polymeric fat acids. These have varying degrees of crystallinity. Certain copolymer polyamides of this type which are in part based on dibasic acids containing from 6 to 10 carbon atoms between the carboxyl group demonstrate particular crystalline characteristics. Among the more desirable dibasic acids are the straight chain aliphatic acids.

Polymeric fat acids are well known and commercially available. One method of preparation of polymeric fat acids can be seen in U.S. Pat. 3,157,681. The preparation of very light colored polymeric fat acids and polyamides thereof which are preferred for use in the present invention can also be seen from U.S. Pat. 3,256,304.

Typical compositions of commercially available polymeric fat acids, based on unsaturated $C_{18}$ fat acids (tall oil fatty acids) are:

|  | Percent by wt. |
|---|---|
| $C_{18}$ monobasic or monomeric fat acids ("monomer") | 5–15 |
| $C_{36}$ dibasic or dimeric fat acids ("dimer") | 60–80 |
| $C_{54}$ (and higher) polybasic or trimeric fat acids ("trimer") | 10–35 |

While the foregoing commercially available product is prepared by polymerization of unsaturated fatty acids in tall oil fatty acids, similar polymeric fat acids may be prepared from other monobasic or monocarboxylic aliphatic acids, naturally occurring or synthetic, having hydrocarbon chains of 8 to 24 carbon atoms which will be referred to herein as a "fat acid" or "monomeric fat acid."

The relative ratios of monomer, dimer and trimer in such unfractionated polymeric fat acids are dependent on the nature of the starting material and the conditions of polymerization. For the purposes of this invention, the term "monomeric fat acids" refers to the unpolymerized monomeric acids, the term "dimeric fat acids" refers to the dimer of the fat acids and the term "trimeric fat acids" refers to the residual higher polymeric forms consisting primarily of trimer acids but containing some higher polymeric forms. The term "polymeric fat acids" as used herein is intended to be generic to polymerized acids obtained from "fat acids" and consists of a mixture of monomeric, dimeric and trimeric fat acids.

The saturated fat acids are generally polymerized by somewhat different techniques than those described in U.S. Pat. 3,157,681, but because of the functional similarity of the polymerization products, they are considered equivalent to those prepared by the methods described as applicable to the ethylenically and acetylenically unsaturated fat acids. While saturated acids are difficult to polymerize, polymerization can be obtained at elevated temperatures with a peroxidic catalyst such as di-t-butyl peroxide. Because of the generally low yields of polymeric products, these materials are not currently commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid, and lignoceric acid.

The ethylenically and acetylenically unsaturated fat acids which may be polymerized and their method of polymerization are described in the above mentioned U.S. Pat. 3,157,681.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or higher polymeric fat acids, often referred to as trimer, present in polymeric fat acids may be determined analytically by conventional gas-liquid chromatography of the corresponding methyl esters. When this analytical technique is employed, a portion intermediate between monomeric fat acids and dimeric fat acids is seen, and is termed herein merely as "intermediate," since the exact nature thereof is not fully known.

As earlier indicated, the preferred polyamides employed in the present invention are those in which the polymeric fat acids employed to prepare the polyamides used in this invention have a dimeric fat acid content in excess of 80% by weight and preferably in excess of 90% by weight since these resins have higher molecular weights. Such polymeric fat acids are obtained by fractionation by suitable means such as high vacuum distillation or by solvent extraction techniques from polymeric fat acids having lower dimeric fat acid contents, such as the common commercially available products described earlier. The polymer fat acids used in this invention are those that have been subjected to a process of hydrogenation, e.g., U.S. 3,256,304 and 2,379,413.

In order that the polymeric fat acid polyamides have the properties desired for this invention, it is generally preferable that the polymeric fat acids employed have a dimeric fat acid content greater than about 80% by weight, more preferably above 90% by weight and most desirably in excess of 95% by weight. This preference arises as a practical matter due to the lack of necessity for trimer or monomer content control at the higher dimer contents to provide polyamides having the desired properties such as tensile strength and elongation. At dimeric fat acid contents above 95% by weight, virtually no control of trimer or monomer content is necessary. At the lowest dimeric fat acid contents, i.e., about 80%, it is preferred that the trimer to monomer ratio by weight be within the range of about 1:1 to 2:1. As the dimeric fat acid content increases, lesser control is needed and the range of the trimer to monomer ratio widens to the point where virtually no attention is required when the dimeric fat acid content approaches values above 95% by weight. At a dimeric fat acid content of about 85% by weight, it is preferred that the trimer to monomer ratio be within the range of about 0.6:1 to 4.0:1. At about 90% dimeric fat acid content, this ratio preferably lies in the range of about 0.3:1 to 10:1. Of course, under idealized conditions, such as 100% dimeric fat acid content, there is no trimer or monomer and the ratio thereby varies theoretically from 0 to infinity.

The resins of the present invention which can be nucleated in accordance with the teachings herein are those which are derived from polymeric fat acids and a second diabasic acid especially the aliphatic straight chain dibasic acids containing from 6 to 10 carbon atoms between the carboxyl groups such as suberic, azelaic, sebacic, undecanedioic dodecanedioic acids. Preferably from 25 to 75% of the polyamide resin is derived from the second dibasic acid. While these resins are truly copolymers in that all of the reactants are reacted together at one time, for ease of designation the quantities of the respective polybasic acids which are employed is set forth in terms of the percentage by weight of the ultimate polyamide resin which is attributable to the particular dibasic acid. Thus, where it is stated that the end product contained 25% of a polyamide derived from an aliphatic dibasic acid, it is meant that the quantity of this dibasic acid and the quantity of the polyamine required to react with it constitute 25% of the total polyamide resin. In other words, the percentage of the two polybasic acids are calculated as though two separate polyamide resins were formed whereas, in fact, all of the reactants are reacted together at the same time to form the copolymer.

The preferred polyamides are those derived by reacting the polymeric fat acids or a mixture of polymeric fat acids and another aliphatic dibasic acid with a diamine, preferably hexamethylene diamine or another diamine containing from 6 to 12 carbon atoms between the amino groups. Typical other polyamines include bis aminomethyl benzene, bis aminomethyl cyclohexane, bis aminoethyl benzene, bis aminoethyl cyclohexane. Thus the diamine may be aliphatic, aromatic or cycloaliphatic.

The polyamides are prepared by conventional amidification procedures, which usually include heating at temperatures around 100 to 300° C., preferably 200 to 275° C., for a time sufficient to complete reaction, usually about 2 to 8 hours and more commonly about 4 to 6 hours. The reaction is generally conducted while removing the byproduct water of reaction, frequently under vacuum, particularly toward the end of the reaction. The polyamide resins of the present invention are essentially neutral in that essentially equivalent amounts of carboxyl and amine groups are employed in preparing the polyamides and the reaction is carried to a substantial degree of completion as indicated by the amount of residual amine and acid groups.

The polymeric nucleating agents which may be used together with the above polyamide resins include nylon 6 (prepared from epsiloncaprolactam), nylon 6,6 (prepared from hexamethylene diamine and adipic acid), nylon 6,10 (prepared from hexamethylene diamine and sebacic acid), nylon 11 (prepared from ω aminoundecanoic acid), nylon 12 (prepared from ω aminododecanoic acid) and a copolymer polyamide derived from bis-aminoethyl benzene and a mixture of polymeric fat acid and sebacic acid within the range of 25/75 to 75/25 on the basis discussed above, provided the copolymer polyamide nucleating agent is not the same copolymer polyamide which is being nucleated. Other nucleating agents include polyethylene, polypropylene, polycarbonates such as the polycarbonate derived from bisphenol A [2,2(4,4'-hydroxyphenyl)propane] and phosgene, and ionomer of polyethylene-acrylic acid copolymer.

The nucleating agent can be added within the range of 0.1 to 10%, preferably in the range of 1 to 5%, by weight based on the weight of polymeric fat acid polyamide.

The nucleating agent may be incorporated in the base resin in any of a variety of ways. It is possible to melt the base resin and the nucleating agent and simply mix them together. In view of the high melting point of some of these resins and the fact that they tend to degrade while held at an elevated temperature, it is preferred not to melt the resin but rather to soften it sufficiently so that by working it is possible to incorporate the nucleating agent into the base resin. With most of the resins employed in the present invention, a suitable softening temperature or fluidizing temperature would be in the range of about 200 to 250° C. At these temperatures, these resins are quite soft and can be worked, particularly in mixing machines of the dough kneading type. The nucleating agent may be added either in the form of pellets or finely divided solids or even in the fluid form. The temperatures employed in the mixing are usually sufficiently high that they are above the melting point of the nucleating agents and accordingly the nucleating agents are easily dispersed in the base resin. Following the inclusion of the nucleating agent, the resin may be converted into any suitable form for storage, sale and shipment as a base resin or may be immediately formed into whatever ultimate shape is desired. This ultimate shaping may involve molding, such as injection molding, sheeting, extrusion, etc.

The following examples will serve to illustrate the invention. In these examples, the polymeric fat acid was derived from tall oil fat acids containing predominantly linoleic acid and oleic acid.

EXAMPLE 1

A copolyamide resin was prepared from hydrogenated and distilled polymeric fat acids containing about 95% dimer acid with minor amounts of monomer, trimer and intermediate. The coacid employed was sebacic acid and the diamine was hexamethylenediamine. The two acids were employed in the ratio of 50% each on the basis hereinbefore described. The copolyamide was prepared essentially following the previous description to yield a polyamide resin having an inherent viscosity of 0.756 and ultimate tensile of 6100 p.s.i., a yield point of 4000 p.s.i. and an elongation of 320%. The resin analyzed for free acid groups as 17.2 meq./kg. acid and for free amine groups as 61 meq./kg. amine. As a control, the resin was molded at 230° C. and samples were cooled rapidly by placing in a second press held at 10° C. and also some samples were cooled at 100° C. To demonstrate the present invention, the same resin was blended with 1% of nylon 6 and the mixture was molded in the same manner. The comparative results are shown in the following table:

TENSILE MODULI OF MOLDED POLYAMIDES

| Conditions of molding | Initial tensile modulus,[a] p.s.i. | |
|---|---|---|
| | Polyamide resin | Polyamide resin plus 1% nylon 6 |
| Quenched at— | | |
| 10° C. | 600 | 38,000 |
| 100° C. | 55,000 | 72,000 |
| Annealed [b] | 73,000 | 98,500 |

[a] ASTM D 412-62T.
[b] Allowed to cool slowly in the press from 230° C. to room temperature.

It is evident that the modulus of the nucleated resin reached a high value immediately. The modulus of the un-nucleated resin quenched at 10° C. changed steadily over a period of several weeks and only attained the ultimate modulus after three weeks or more. The other moduli increased only slightly with time.

Further, the solvent resistances of the nucleated and un-nucleated resins were quite different. Samples of the above nucleated and un-nucleated resins were quenched at 2° C. These resins were then immersed in various solvents for a period of 7 days and the solvent resistance was determined as a percent of weight change. The results are indicated in the following table:

TABLE 1

Solvent Resistance: Weight Change Data
[After 7 days immersion]

| Solvent | Percent change weight | |
|---|---|---|
| | Un-nucleated polyamide resin | Nucleated polyamide resin |
| Benzene | 21 | 15 |
| Ethanol | 17 | 13 |
| Toluene | 19 | 13 |
| Carbon tetrachloride | 31 | 18 |
| Ethyl acetate | 14 | 10 |
| Ethylene dichloride | 25 | 18 |
| Hydrochloric acid | 0 | 0 |
| Brake fluid | 5.5 | 4.6 |
| Transmission fluid | 0 | 0 |
| Freon 11 | 23 | 14 |
| Average | 15.5 | 10.6 |

NOTE.—0=<±1% change weight.

EXAMPLE 2

In this example, the same polyamide as in Example 1 was used as the base resin. Samples of this resin were nucleated with:

(A) 1% of high density polyethylene
(B) 1% of nylon 6,10
(C) 5% of a polyamide resin derived from bisaminoethyl benzene, hydrogenated distilled dimer acid of Example 1 and sebacic acid in which the sebacic acid and the hydrogenated distilled dimer were used in the respective ratios of 25 to 75% as herein defined.

After the nucleating resins were embodied in the base polyamide resin, molded sheets were formed and these were then quenched at from 2 to 10° C. The results are indicated in the following table:

TABLE

| Resin: | Average initial tensile modulus (p.s.i.) |
|---|---|
| Control | 800 |
| A | 22,400 |
| B | 39,600 |
| C | 18,300 |

In addition to the above-determined effect on the tensile modulus, it was noted that the coefficient of friction varied among the various samples. The coefficient of friction, to a certain degree, measures the tack of the resin and it was found that the nucleated samples showed a lower initial tack. For example, the coefficient of friction of the control measured against itself shortly after molded pieces were quenched at 100° C. is 0.99 whereas the sample nucleated with nylon 6 had a coefficient of friction of 0.46 and the one containing the high density polyethylene had a coefficient of friction of 0.78.

EXAMPLE 3

A series of polyamide resins were made, starting with dimeric fat acid of the type described in Example 1, together with the type and amount of coacid and diamine indicated in the table below. By following the general procedure previously described, resins were produced which had the acid and amine characteristics indicated in the table labeled "Polyamide Resins."

These polyamide resins were then used in conjunction with the nucleating agents indicated in the list headed "Nucleating Agent." The amount and type of nucleating agent are indicated in the final table. These base resins and nucleating agents were mixed at temperatures from about 200 to 300° C. in order to incorporate the nucleating agent into the base polymer. Thereafter, the mixed resins were all molded at temperatures varying from about 420 to 450° C. and were quenched at temperatures indicated in the table. The final tensile modulus for the various resins is indicated in the table.

POLYAMIDE RESINS

| | Co-acid | Percent co-acid | Amine | Meq./kg. | |
|---|---|---|---|---|---|
| | | | | Acid | Amine |
| D | Sebacic | 25 | Hexamethylene diamine. | 6.9 | 17.5 |
| E | do | 35 | do | 19.43 | 16.82 |
| F | do | 50 | do | 17.2 | 61.0 |
| G | do | 60 | do | 6.7 | 20.4 |
| H | do | 75 | do | 41.1 | 12.4 |
| I | Suberic | 50 | do | 10.0 | 141.0 |
| J | Azelaic | 50 | do | 53.0 | 68.8 |
| K | Didodecanoic | 50 | do | 5.1 | 101.5 |

NUCLEATING AGENTS

| | Compound | Trade name | Source | Sp. gr. 25° C. | Yield strength 25° C., p.s.i. | Izod impact 25° C., ft.-lbs./in. notch | Percent elongation 25° C. | Water absorption, percent | Stiffness, p.s.i. |
|---|---|---|---|---|---|---|---|---|---|
| 1 | Nylon 6 | Spencer 401 | Spencer Chem. Co. | 1.14 | 11,800 | 1.0 | 50 | 2.35 | 240,000 |
| 2 | do | Spencer 601 | do | 1.14 | 11,700 | 1.1 | 70 | 2.10 | 230,000 |
| 3 | Nylon 6,6 | Zytel 101 | E. I. du Pont de Nemours and Co. | 1.14 | 11,800 | 0.9 | 60 | 8 | |
| 4 | Nylon 6, 10 | Zytel 31 | do | 1.09 | 8,500 | 0.6 | 85 | 3.5 | |
| 5 | Nylon 11 | BCI-1157 | Belding Corticelli Ind., Inc. | 1.04 | 8,500 | 3.5 | 100 | 0.4 | |
| 6 | do | BCI-1200 | do | 1.02 | 7,380 | | 200 | 1.40 | |
| 7 | High density polyethylene | Alathon 7250 | E. I. du Pont de Nemours and Co. | 0.95 | 3,300 | | 800 | 0.01 | 95,000 |
| 8 | Polypropylene | JGD-1800 | Union Carbide | 0.905 | 5,000 | 1.2 | | 0.02 | |
| 9 | Polyethylene acrylic acid copolymerionomer. | Surlyn A-E | E. I. du Pont de Nemours and Co. | 0.93-0.94 | 2,000-2,500 | 5.7-14.6 | 300-400 | | |
| 10 | Polycarbonate derived from bisphenol A and phosgene. | Lexan 100 | General Electric Co. | 1.20 | 8,500 | | 75 | 0.15 | |

MOLDED PRODUCTS

| Base resin: | Nucleating agent | Percent nucleating agent | Quench temp., °C. | Tensile modulus, p.s.i. |
|---|---|---|---|---|
| D | None | | 100 | 403 |
| D | 4 | 1.0 | 100 | 21,400 |
| D | 10 | 1.0 | 100 | 1,895 |
| D | 2 | 1.0 | 100 | 13,300 |
| D | 7 | 1.0 | 100 | 18,400 |
| D | 2 | 5.0 | 100 | 23,500 |
| D | 4 | 5.0 | 100 | 16,450 |
| D | 2 | 10.0 | 100 | 22,000 |
| D | 4 | 10.0 | 100 | 24,200 |
| E | None | | 2 | 2,488 |
| E | 3 | 1.0 | 2 | 12,400 |
| E | 4 | 1.0 | 2 | 17,200 |
| E | 10 | 1.0 | 2 | 8,950 |
| E | 2 | 1.0 | 2 | 12,900 |
| E | 5 | 1.0 | 2 | 4,200 |
| E | 1 | 1.0 | 2 | 11,800 |
| F | None | | 10 | 1,170 |
| F | 1 | 0.1 | 10 | 2,320 |
| F | 1 | 0.5 | 10 | 15,320 |
| F | 1 | 1.0 | 10 | 23,500 |
| F | 1 | 5.0 | 10 | 31,300 |
| F | None | | 10 | 1,100 |
| F | 1 | 1.0 | 10 | 42,800 |
| F | 4 | 1.0 | 10 | 47,800 |
| F | None | | 2 | 856 |
| F | 9 | 1.0 | 2 | 40,300 |
| F | 8 | 1.0 | 2 | 69,200 |
| F | 7 | 1.0 | 2 | 30,500 |
| F | 10 | 1.0 | 2 | 30,300 |
| F | 3 | 1.0 | 2 | 50,700 |
| F | 5 | 1.0 | 2 | 6,180 |
| F | 6 | 1.0 | 2 | 33,300 |
| G | None | | 2 | 1,445 |
| G | 1 | 1.0 | 2 | 49,700 |
| G | 4 | 1.0 | 2 | 48,000 |
| H | None | | 2 | 3,800 |
| H | 1 | 1.0 | 2 | 102,000 |
| H | 4 | 1.0 | 2 | 92,300 |
| I | None | | 20 | 49,600 |
| I | 2 | 1.0 | 20 | 59,100 |
| J | None | | 20 | 2,500 |
| J | 8 | 1.0 | 20 | 15,650 |
| K | None | | 20 | 6,300 |
| K | 2 | 1.0 | 20 | 75,000 |

In connection with the results shown above with reference to base resins, it is to be noted that there are three distinct groups of results. Each of the tests within a group may be compared directly with the other tests within the group. The difference between the respective groups is the fact that the first group was mixed at 250° C. and molded at 420; the second group was mixed at 200° C. and molded at 420 and the third group was mixed at 250° C. and molded at 450° C. These processing differences account for the slight variations in the moduli of the control resins.

In addition to the above named nucleating agents, the following are also suitable; polyolefins derived from the polymerization of simple olefins (2–6 carbon atoms) such as both high and low density polyethylene, polypropylene, polybutylene, amorphous polypropylene, polymethyl pentene; copolymers or the short chain olefins such as ethylene-propylene copolymers, ethylene-butylene copolymers; terpolymers of acrylonitrile, butadiene, and styrene; polystyrene; natural rubber; balata; a polyol modified polyethylene terephthalate; paraffin wax; and microcrystalline waxes.

EXAMPLE 4

The following procedure was used to prepare other nucleated products. The dimer acid and co-acid along with the conventional type catalysts, i.e. 10% $H_3PO_4$ in an amount of about 0.3% by weight of the dimer acid and co-acid, and the conventional antifoam agents were added to the reactor. The reactor was equipped with a stirrer, thermocouple, and distillation head. The diamine was added to the reactor after the reactor was put under a vacuum. With stirring, the vessel was heated to 200° C. in about ¾ hour. The reactor was held at 200° C. for one hour and the water vapor vented off. The reactor was purged with nitrogen and the temperature raised to 250° C. for ½ hour. The pressure in the reactor was reduced and the reactor put under a vacuum of 3–5 mm. Hg followed by heating at 250° C. for 1–3 hours. The nucleating agent can be added just prior to the pulling of the vacuum on the reactor. However, if the nucleating agent is one of the reactive ones, i.e., contained caprolactam, the vacuum should be 0.5 mm. Hg to remove any unreacted lactam. The following resins were prepared in accordance with the above procedure.

Resin L

| Reactant: | | Quantity |
|---|---|---|
| Hydrogenated dimer acid | lbs | 78.898 |
| Sebacic acid | lbs | 21.47 |
| Hexamethylene diamine | lbs | 40.45 |
| Equivalent percent co-acid (sebacic) | | 43.3 |

Dimer acid analysis

| | | |
|---|---|---|
| Acid No. | | 195.5 |
| Saponification No. | | 195.8 |
| Iodine No. | | 10.4 |
| Monomer | percent | 1.0 |
| Intermediate | do | 4.1 |
| Trimer | do | 0.3 |
| Dimer | do | 94.6 |

Resin L analysis

| | |
|---|---|
| Free acid groups (meq. acid/kg.) | 7.7 |
| Free amine groups (meq. amine/kg.) | 32.7 |
| Melt index, 20° C. | 2.3 |

Resin M

| Reactant: | | Quantity |
|---|---|---|
| Hydrogenated dimer acid | lbs | 85.47 |
| Sebacic acid | lbs | 37.58 |
| Hexamethylene diamine | lbs | 56.27 |
| Equivalent percent co-acid (sebacic) | | 55.3 |

Dimer acid analysis

| | | |
|---|---|---|
| Acid No. | | 195.5 |
| Saponification No. | | 195.8 |
| Iodine No. | | 10.4 |
| Monomer | percent | 1.0 |
| Intermediate | do | 4.1 |
| Dimer | do | 94.6 |
| Trimer | do | 0.3 |

Resin M analysis

| | |
|---|---|
| Free acid groups (meq. acid/kg.) | 4 |
| Free amine groups (meq. amine/kg.) | 49.2 |
| Melt index, 205° C. | 2.6 |

Resin N

| Reactant: | | Quantity |
|---|---|---|
| Hydrogenated dimer acid | lbs | 61.37 |
| Sebacic acid | lbs | 50.11 |
| Hexamethylene diamine | lbs | 58.24 |
| Equivalent percent co-acid (sebacic) | | 69.7 |

Dimer acid analysis

| | | |
|---|---|---|
| Acid No. | | 193.55 |
| Saponification No. | | 198.05 |
| Iodine No. | | 18.2 |
| Monomer | percent | 0.6 |
| Intermediate | do | 4.3 |
| Dimer | do | 94.9 |
| Trimer | do | 0.2 |

Resin N analysis

| | |
|---|---|
| Free acid groups (meq. acid/kg.) | 34.6 |
| Free amine groups (meq. amine/kg.) | 32.2 |
| Melt index, 215° C. | 3.2 |

Resin O

| Reactant: | | Quantity |
|---|---|---|
| Hydrogenated dimer acid | lbs | 84.47 |
| Azelaic acid | lbs | 22.85 |
| Hexamethylene diamine | lbs | 44.75 |
| Equivalent percent co-acid (azelaic) | | 44.5 |

Dimer acid analysis

| | |
|---|---|
| Acid No. | 193.3 |
| Saponification No. | 196.5 |
| Iodine No. | 15 |
| Monomer _____percent | 0.5 |
| Intermediate _____do | 3.9 |
| Dimer _____do | 95.4 |
| Trimer _____do | 0.2 |

Resin O analysis

| | |
|---|---|
| Free acid groups (meq. acid/kg.) | 5.9 |
| Free amine groups (meq. amine/kg.) | 45 |
| Melt index, 205° C. | 6.5 |

Resin P

| Reactant: | Quantity |
|---|---|
| Hydrogenated distilled dimer _____lbs | 79.8 |
| Azelaic acid _____lbs | 34.4 |
| Hexamethylene diamine _____lbs | 55.0 |
| Equivalent percent co-acid (azelaic) | 56.5 |

Dimer acid analysis

| | |
|---|---|
| Acid No. | 196.1 |
| Saponification No. | 197.6 |
| Iodine No. | 17.4 |
| Monomer _____percent | 1.3 |
| Intermediate _____do | 3.6 |
| Dimer _____do | 93.7 |
| Trimer _____do | 1.8 |

Resin P analysis

| | |
|---|---|
| Free acid groups (meq. acid/kg.) | 23.2 |
| Free amine groups (meq. amine/kg.) | 55.8 |
| Melt index, 205° C. | 5.7 |

Resin Q

| Reactant: | Quantity |
|---|---|
| Hydrogenated distilled dimer _____lbs | 20.6 |
| Azelaic acid _____lbs | 73.6 |
| Hexamethylene diamine _____lbs | 76.9 |
| Equivalent percent co-acid (azelaic) | 87.9 |

Dimer acid analysis

| | Percent |
|---|---|
| Monomer | 1.7 |
| Intermediate | 3.3 |
| Dimer | 93.3 |
| Trimer | 1.6 |

Resin Q analysis

| | Percent |
|---|---|
| Free acid groups (meq. acid/kg.) | 3.4 |
| Free amine groups (meq. amine/kg.) | 122.3 |
| Melt index, 215° C. | 2.8 |

The following molding procedure was used to test the various nucleated resins. About 15 grams of the resin was placed in the center of a 6 inch x 6 inch x 0.017 inch picture frame which was enclosed between two 9 inch x 12 inch ferro type platens. The platens and picture frame were treated with a conventional silicone release agent. The platens containing the resin and frame was placed in a press at a temperature of 232° C. The press was closed but no pressure was applied. After four minutes, a force of 20,000 pounds, as indicated by the gauge, was applied on the ferrotype platens. The resin was held under these conditions for four minutes. After the four minutes, the resin was quenched at the temperature and under the condition shown below.

For resins L, M, and P, the resin was quenched at 100° C. in a second press under 3000 pounds force for exactly two minutes. The platens with the resin were removed and immediately placed between two 10 inch x 12 inch x ⅜ inch thick aluminum plates kept at −12° C. After three minutes, the molded piece was removed and stored at −12° C. until tested, preferably within 6 hours.

The same procedure was used for resins O, N, and Q except the quench temperature and time was as follows:

| | Quench temp., ° C. | Time, minutes |
|---|---|---|
| Resin: | | |
| O | 100 | 5 |
| N | 40 | 5 |
| Q | 5 | 5 |

NUCLEATING AGENTS

| | Compound | Trade name | Source | Sp. gr. | Yield strength, 25° C., p.s.i. | Izod impact 25° C., ft.-lbs./in. notch | Percent elongation, 25° C. | Water absorption, percent | Stiffness, p.s.i. |
|---|---|---|---|---|---|---|---|---|---|
| 11 | Acrylonitrile. butadiene. styrene terpolymer. | Abson 821 | B. F. Goodrich Co. | 1.04 | 6,300 | 4.0 | 7-10 | | |
| 12 | do | Abson 89131 (Nat). | do | 1.04 | 5,800 | | | | |
| 13 | Polypropylene | Shell 5220 | Shell Chem. Co. | 0.905 | 4,300 | 4.2 | 10 | | |
| 14 | Amorphous polypropylene | Oletac 100 | Avisun Corp. | 0.86 | | 1.0 | | Melt index=0.7 gm./10 min. | |
| 15 | Ethylenepropylene copolymer | Tenite polyallomer 5221. | Eastman Chem. Prod. | 0.897 | 3,750 | | 21 | | 90,000 |
| 16 | Ethylenebutylene copolymer | Marlex 5005 | Phillips Pet. Co. | 0.950 | 3,800 | 2.0 | 50 | | 115,000 |
| 17 | Polybutylene | | Mobil Chem. Co. | 0.91 | 4,200 | | | 360 | Melt index=1.8 gm./10 min. |
| 18 | Polymethyl pentene | TPX resin | Imperial Chem. Industries. | 0.83 | 4,000 | 0.8 | 15 | 0.01 | |
| 19 | Natural rubber | | | 0.9 | | | | | |
| 20 | Polystyrene | Styron 685 | Dow Chem. Co. | 1.04 | 7,900 | 0.45 | 2.4 | 0.05 | 485,000 |
| 21 | Polyol modified polyethylene terephthalate. | Arnite | Algemene Kunstzijde | 1.38 | 11,400 | 0.8 | 200 | 0.6 | |
| 22 | Microcrystalline wax | Sunoco Wax 985. | Sun Oil Co. | 0.943 | Oil content=0.4%; viscosity=SUS(210° F.)84; melting point=193° F. | | | | |
| 23 | Balata | | | | | | | | |
| 24 | Low density polyethylene | Microthene FN 510. | U.S.I. Chemicals | 0.924 | 2,000 | | 150 | Melt Index=5 gm./10 min. | |
| 25 | Paraffin wax | Sunoco Wax 4417. | Sun Oil Co. | 0.924 | Oil content=0.4%; viscosity=SUS(210° F.) 39.2; melting point=139° F. | | | | |

MOLDED PRODUCTS

| Base resin: | Nucleating agent | Percent nucleating agent | 2% tensile modulus, p.s.i.[1] |
|---|---|---|---|
| L | None | | 3,000 |
| L | 7 | 0.25 | 18,000 |
| L | 7 | 1.0 | 14,800 |
| M | None | | 14,100 |
| M | 12 | 10.0 | 31,000 |
| M | 11 | 1.0 | 28,600 |
| M | 7 | 0.25 | 28,200 |
| M | 7 | 1.0 | 24,000 |
| M | None | | 18,350 |
| M | 14 | 5.0 | 28,300 |
| M | 22 | 1.0 | 24,700 |
| M | 15 | 1.0 | 27,700 |
| M | 15 | 10.0 | 32,800 |
| M | 16 | 1.0 | 27,900 |
| M | 20 | 1.0 | 27,300 |
| M | 20 | 5.0 | 26,600 |
| M | 20 | 10.0 | 27,800 |
| M | 23 | 1.0 | 26,000 |
| M | 18 | 1.0 | 27,300 |
| M | 24 | 1.0 | 32,000 |
| M | 17 | 1.0 | 25,600 |
| M | 19 | 1.0 | 28,500 |
| M | None | | 22,200 |
| M | 19 | 10.0 | 31,300 |
| M | 25 | 1.0 | 29,100 |
| N | None | | 2,326 |
| N | 20 | 1.0 | 14,600 |
| N | 20 | 10.0 | 12,400 |
| N | 18 | 1.0 | 8,600 |
| O | None | | 1,200 |
| O | 13 | 0.25 | 9,900 |
| O | 13 | 1.0 | 9,900 |
| O | 20 | 1.0 | 8,600 |
| P | None | | 4,000 |
| P | 13 | 1.0 | 21,700 |
| Q | None | | 9,100 |
| Q | 7 | 1.0 | 22,600 |
| Q | 21 | 1.0 | 31,100 |
| Q | 20 | 1.0 | 20,700 |
| Q | 13 | 1.0 | 16,300 |

[1] ASTM-D 638-60T.

The above examples illustrate that there are phenomenal increases in tensile modulus obtainable within the scope of this invention. Furthermore, the nucleated products of this invention are excellent adhesives and possess excellent peel strength characteristics. Many other advantages of this invention will be readily apparent to those skilled in the art.

The embodiments of the invention in which an exclusive property or privilege is claimed are defined as follows:

1. A nucleated crystalline polyamide resin having intimately dispersed therein 0.1–10% by weight of the crystalline polyamide of a solid nucleating agent wherein the crystalline polyamide is derived from hydrogenated polymeric fat acid having a dimer content of at least 80% by weight and a trimer to monomer ratio of at least 1:1 to 2:1 when said dimer content is 80% by weight, a coacid of from 6–10 carbon atoms between the carboxyl groups, and a diamine, wherein 25–75% by weight of the crystalline polyamide is derived from the reaction product of the coacid and the diamine and wherein said nucleating agent is a compound selected from the group consisting of (A) polyolefins of monoolefins containing 2–6 carbon atoms, copolymers of mixtures of said monoolefins and the ionomer of ethylene-acrylic acid copolymer, (B) a polyamide selected from the group consisting of (1) a polyamide of epsilon caprolactam,
(2) a polyamide of ω-amino undecanoic acid,
(3) a polyamide of ω-aminododecanoic acid,
(4) a polyamide of hexamethylene diamine and adipic acid,
(5) a polyamide of hexamethylene diamine and sebacic acid, and
(6) a copolymer polyamide resin derived from polymeric fat acids, sebacic acid, and bisaminoethylbenzene provided the copolymer polyamide nucleating agent is not the same as the crystalline polyamide resin being nucleated, and (C) polycarbonate of p,p'-isopropylidenediphenol and phosgene, (D) polystyrene and terpolymers of acrylonitrile, butadiene, and styrene, (E) natural rubber and balata, and (F) paraffin wax and microcrystalline wax.

2. A nucleated crystalline polyamide resin having intimately dispersed therein 0.1–10% by weight of the crystalline polyamide of a solid nucleating agent wherein the crystalline polyamide is derived from hydrogenated polymeric fat acid having a dimer content of at least 80% by weight and a trimer to monomer ratio of at least 1:1 to 2:1 when said dimer content is 80% by weight, a coacid of from 6–10 carbon atoms between the carboxyl groups, and a diamine, wherein 25–75% by weight of the crystalline polyamide is derived from the reaction product of the coacid and the diamine and wherein said nucleating agent is a polymer of a monoolefin containing 2–6 carbon atoms.

3. A nucleated crystalline polyamide resin having intimately dispersed therein 0.1–10% by weight of the crystalline polyamide of a solid nucleating agent wherein the crystalline polyamide is derived from hydrogenated polymeric fat acid having a dimer content of at least 80% by weight and a trimer to monomer ratio of at least 1:1 to 2:1 when said dimer content is 80% by weight, a coacid of from 6–10 carbon atoms between the carboxyl groups, and a diamine, wherein 25–75% by weight of the crystalline polyamide is derived from the reaction product of the coacid and the diamine and wherein said nucleating agent is polyethylene.

4. A nucleated polyamide resin as defined in claim 2 wherein said nucleating agent is an ethylene-acrylic acid copolymer.

5. A nucleated polyamide resin as defined in claim 2 wherein said nucleating agent is polypropylene.

6. A nucleated polyamide resin as defined in claim 2 wherein said nucleating agent is an ethylene-propylene copolymer.

7. A nucleated polyamide resin as defined in claim 2 wherein said nucleating agent is polybutylene.

8. A nucleated polyamide resin as defined in claim 2 wherein said nucleating agent is an ethylene-butylene copolymer.

9. A nucleated polyamide resin as defined in claim 2 wherein said nucleating agent is polymethylpentene.

10. A nucleated polyamide resin as defined in claim 2 wherein said diamine is hexamethylene diamine.

11. A nucleated polyamide resin as defined in claim 2 wherein said coacid is sebacic or azelaic acid.

12. A nucleated polyamide resin as defined in claim 2 wherein said polymeric fat acid has a dimer content greater than 90% by weight.

13. A nucleated polyamide resin as defined in claim 2 wherein said nucleating agent content is 1–5% by weight of the crystalline polyamide.

References Cited

UNITED STATES PATENTS

| 2,469,108 | 5/1949 | Fries | 260—23 |
| 2,852,485 | 9/1958 | Stott et al. | 260—37 |
| 3,240,732 | 3/1966 | Ham et al. | 260—18 |
| 3,256,304 | 6/1966 | Fischer et al. | 260—407 |
| 3,391,125 | 7/1968 | Mourik et al. | 260—857 X |

FOREIGN PATENTS

| 797,038 | 6/1958 | Great Britain | 260—35 DIG. |

DONALD E. CZAJA, Primary Examiner

D. J. BARRACK, Assistant Examiner

U.S. Cl. X.R.

260—18 N, 23 H, 23 S, 23.7 R, 23.7 N, 857 R